(12) United States Patent  (10) Patent No.: US 7,636,182 B2
Guo  (45) Date of Patent: Dec. 22, 2009

(54) SCANNING TABLE AND SCANNING DEVICE OF THE SAME

(75) Inventor: Yan-Liang Guo, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 321 days.

(21) Appl. No.: 11/599,446

(22) Filed: Nov. 15, 2006

(65) Prior Publication Data

US 2007/0109609 A1 May 17, 2007

(30) Foreign Application Priority Data

Nov. 16, 2005 (TW) .............................. 94219854 U

(51) Int. Cl.
*H04N 1/04* (2006.01)
*G03G 15/00* (2006.01)

(52) U.S. Cl. ................. 358/497; 358/474; 358/408; 358/471; 399/362; 399/379

(58) Field of Classification Search ................. 358/474, 358/497, 408, 505, 401, 471; 355/25, 75; 399/362, 379, 380; 248/455; D14/424
See application file for complete search history.

(56) References Cited

U.S. PATENT DOCUMENTS

2007/0019253 A1* 1/2007 Huang ........................ 358/474
2007/0109609 A1* 5/2007 Guo ........................... 358/474

FOREIGN PATENT DOCUMENTS

JP     2000165608 A   *   6/2000

* cited by examiner

*Primary Examiner*—Cheukfan Lee
(74) *Attorney, Agent, or Firm*—Rosenberg, Klein & Lee

(57) ABSTRACT

The present invention provides a scanning table and a scanning device of the same. The scanning table comprises a table surface and two sides. The scanning device comprises a first transparent case provided on the table surface, a second transparent case provided on one side and adjacent to the first transparent case, a first scanning module provided inside the first transparent case, a second scanning module provided inside the second transparent case, and a transporting device for operatively connecting the first scanning module and the second scanning module with each other and scanning the left and right inner pages of the book. With the above arrangement, the user can read on the table while easily scan the contents of the book without damaging the book.

18 Claims, 4 Drawing Sheets

SCANNING TABLE AND SCANNING DEVICE OF THE SAME

BACKGROUND OF THE INVENTION

1. Field of the Invention

The present invention relates to a scanning table and a scanning device of the same, and in particular to a scanning table and a scanning device of the same, by which a user can read on the table and easily scan the desired contents of a book without damaging the book.

2. Description of Prior Art

With reference to FIG. 1, it is a perspective view showing a conventional table and a scanner. Generally, when a reader reads a book on a table 100 in the library, if he/she wants to copy or scan the important chapters or sections of the book, he/she needs to further walk to a region for copying or scanning operation after he/she found the desired chapters and sections of the book to be scanned because the table 100 and the scanner 102 are separate from each other in the traditional library. Moreover, when the reader intends to scan more than one book, at this time, he/she needs to take many books and walk to the region for copying or scanning operation, which is very inconvenient for the reader.

Further, since the table 100 and the scanner 102 are separate form each other in the traditional library, many readers may usually line up to wait for copying or scanning, which wastes the time of the readers and affects the space application of the library.

Therefore, according to the above, the copying or scanning operation in the traditional library indeed has certain inconvenience and disadvantages and thus needs to be improved.

Therefore, in view of the above drawbacks, the inventor proposes the present invention to efficiently overcome the drawbacks of prior art based on his deliberate researches and expert experiences.

SUMMARY OF THE INVENTION

The object of the present invention is to provide a scanning table for simultaneously scanning the left and right inner pages of a book by integrally combining a right-angle surface formed of two scanning modules with the table, so that the user in the library can read on the table and easily scan the contents of the book without damaging the book. After finishing the scanning, he/she can take the digital information away via a built-in USB port, thereby to save time.

In order to achieve the above object, the present invention provides a scanning table and a scanning device of the same. The scanning table comprises a table surface and two sides. The scanning device comprises a first transparent case provided on the table surface, a second transparent case provided on one side and adjacent to the first transparent case, a first scanning module provided inside the first transparent case, a second scanning module provided inside the second transparent case, and a transporting device for operatively connecting the first scanning module and the second scanning module with each other and scanning the left and right inner pages of the book. With the above arrangement, the user can read on the table while easily scan the contents of the book without damaging the book.

In order to further understanding the technique, measures and effects of the present invention, a detailed description thereof will be made with reference to the accompanying drawings so as to clearly appreciate the characteristics and technical contents of the present invention. However, it should be understood that the drawings and the description are illustrative but not used to limit the scope of the present invention.

DETAILED DESCRIPTION OF THE INVENTION

Figure 1:
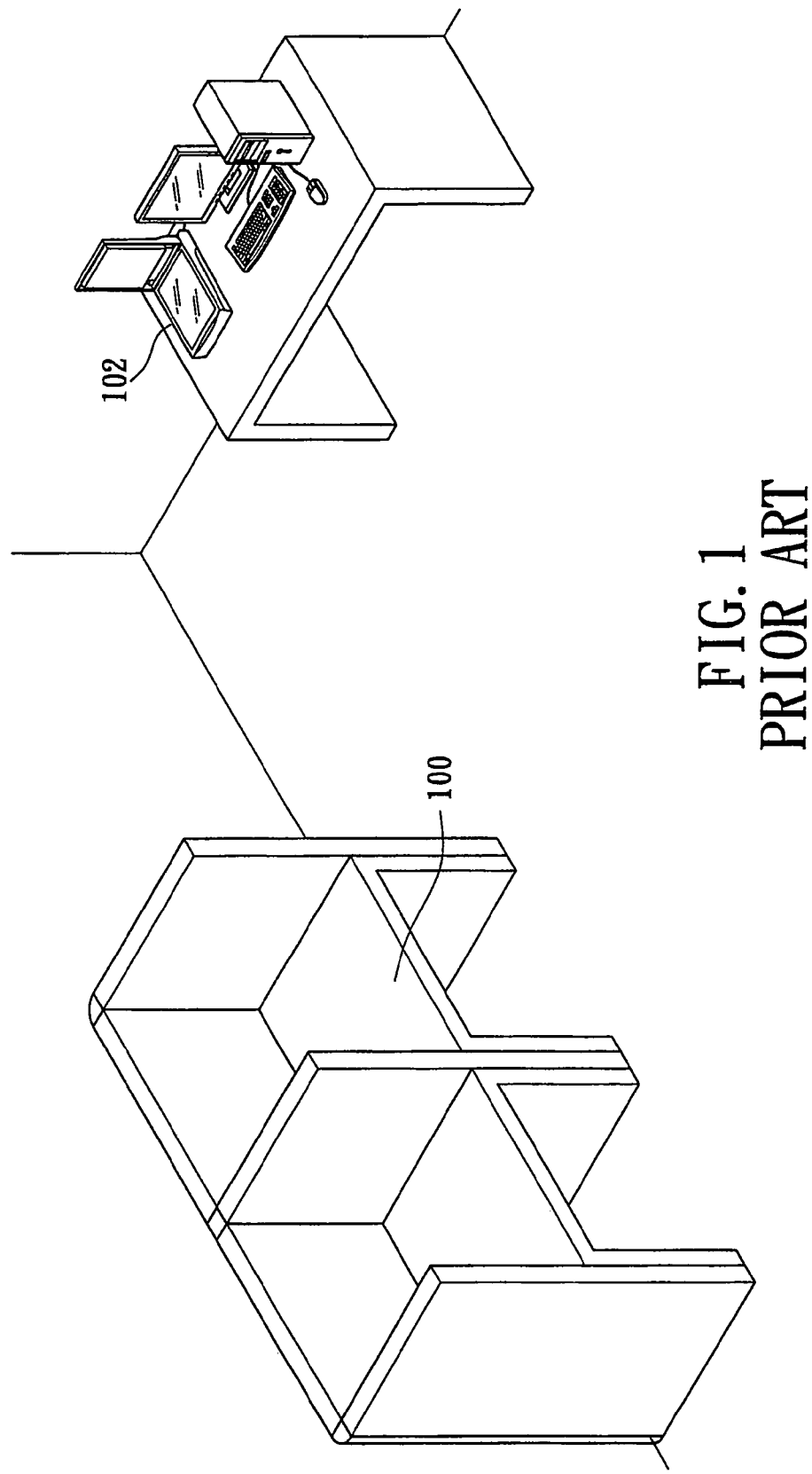
FIG. 1 is a perspective view of the conventional table and scanner.
Figure 2:
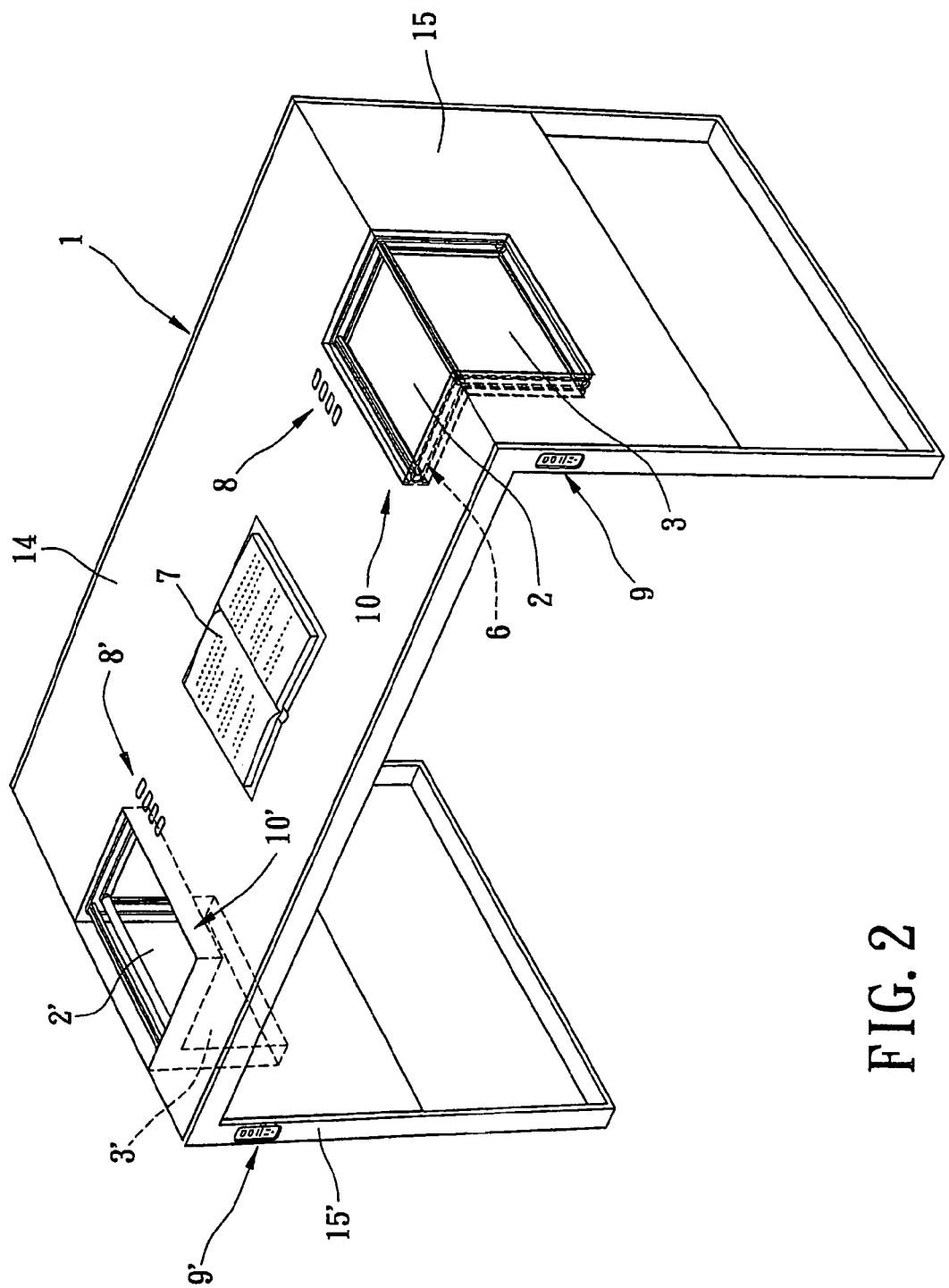
FIG. 2 is a perspective view of the scanning table of the present invention.
Figure 3:
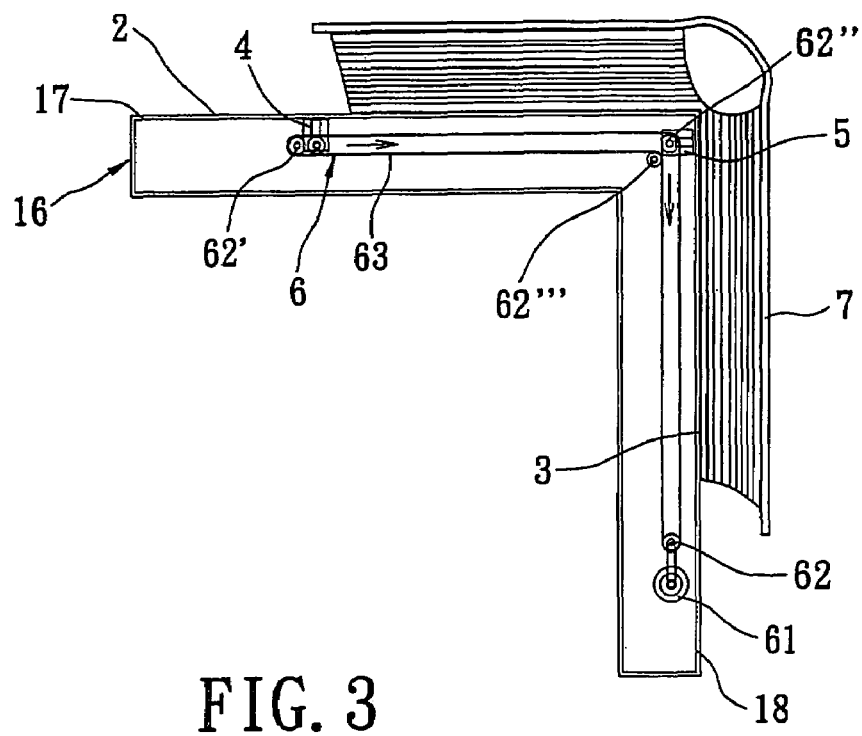
FIGS. 3 and 4 are schematic views showing the operation of the scanning device of the present invention for simultaneously scanning the left and right inner pages of the book.
Figure 4:
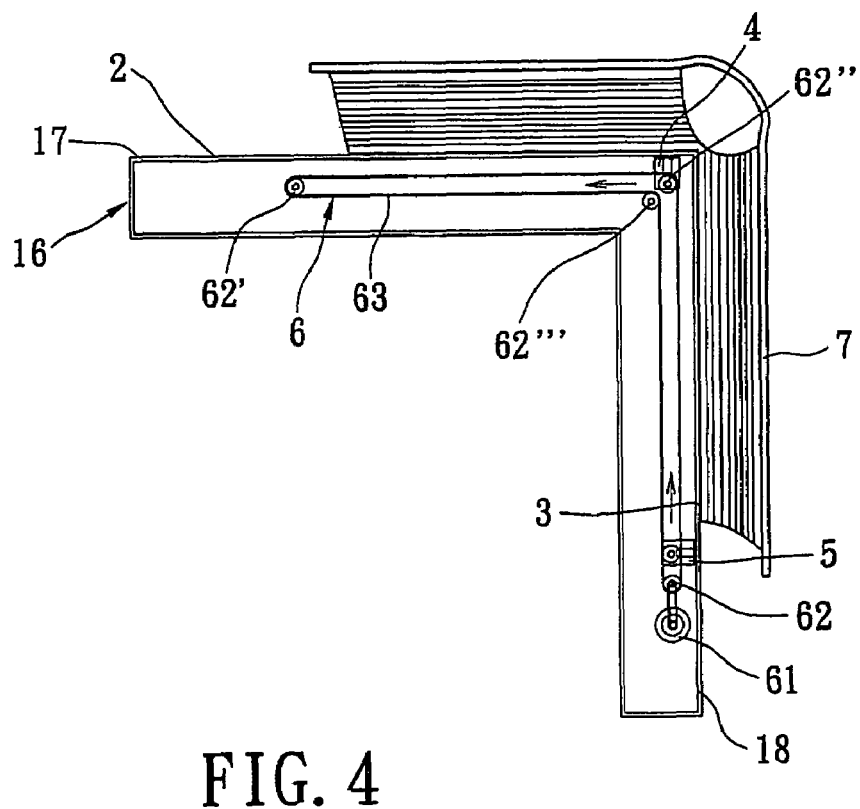

With reference to FIGS. 2 to 4, the scanning table comprises a table body 1 including a table surface 14, a first side 15 and a second side 15'. The first side 15 and the second side 15' are adjacent to the surface 14. A first scanning device 10 is provided in the table body 1. The first scanning device 10 comprises: a first scanning region 2 (first transparent case) provided on the surface 14 of the table; a second scanning region 3 (second transparent case) provided on the first side 15 and adjacent to the first scanning region 2; a first scanning module 4 and a second scanning module 5 for simultaneously scanning the first scanning region 2 and the second scanning region 3, respectively; and a transporting device 6 for operatively connecting the first scanning module 4 and the second scanning module 5, so as to correspondingly scan the first scanning region 2 and the second scanning region 3.

Preferably, the scanning table is designed to have a second scanning device 10' provided in the table body 1. The second scanning device 10' comprises: a third scanning region 2' (third transparent case) provided on the table surface 14; a fourth scanning region 3' (fourth transparent case) provide on the second side 15' and adjacent to the third scanning region 2'; and a third scanning module and a fourth scanning module (not shown) for simultaneously scanning the third scanning region 2' and the fourth scanning region 3', respectively.

Further, the present invention includes an operating panel 8, 8' and an external port 9, 9' provided on the table body 1 and electrically connected to the scanning device 10 and 10'. The operating panel 8, 8' allows the user to directly operate the scanning function and save the data to a digital device (such as a flash drive) of the user. Further, the external port 9, 9' includes sockets for connecting a power supply or an external device for output the scanned data from the scanning device 10 and 10'. For example, the user can take the data away by a digital storage device, or use a laptop coupled by the USB connecting line to directly perform a document processing on the scanning table, thereby to increase the efficiency.

Further, with reference to FIG. 3 and FIG. 4, the present invention can be also a scanning device for scanning a book 7, which comprises: a main body 16 comprising a first plane 17 and a second plane 18 adjacent to the first plane 17, the second plane 18 being not parallel to the first plane 17; a first transparent 2 provided in the first plane 17; a second transparent case 3 provided in the second plane 18, the second transparent case 3 being adjacent to the first transparent case 2; a first scanning module 4 provided inside the first transparent case 2; a second scanning module 5 provided inside the second transparent case 3; a transporting device 6 provided inside the main body 16 for operatively connecting the first scanning module 4 and the second scanning module 5 so as to scan the book 7 on the first transparent case 2 and the second transparent case 3. The transporting device 6 includes a driving motor 61, a plurality of rollers 62, 62', 62", 62''', and a transmission caterpillar 63.

Therefore, with the right-angle arrangement formed by first transparent case 2 and the second transparent case 3, when a book 7 is scanned, the construction of the book 7 will not be damaged or the pages of older books may not be lost by excessively turning over the book.

The two scanning modules 4, 5 are provided inside the two transparent cases 2, 3, respectively. The first scanning module 4 can be horizontally moved from one end of the first transparent case 2 to the intersecting end of the first transparent case 2 and the second transparent case 3. The second scanning module 5 can be vertically moved from the intersecting end of the first transparent case 2 and the second transparent case 3 to one end of the second transparent case 3, thereby to allow the limited scanning area to reach the innermost side of the book 7.

With the reference to FIG. 3 and FIG. 4 again, in using the scanning function of the present invention (FIG. 3), the user disposes the book to be scanned on the two transparent cases 2, 3. After activating the scanning function, the driving motor 61 drives the rollers 62, 62', 62", 62''' and also drives the transmission caterpillar 63, thereby to draw the first scanning module 4 to horizontally moved from one end of the first transparent case 2 to the intersecting end of the first transparent case 2 and the second transparent case 3. Then, the second scanning module 5 can be vertically moved downwardly from the intersecting end of the first transparent case 2 and the second transparent case 3 to one end of the second transparent case 3, so that the limited scanning area can reach the innermost side of the book. After finishing the scanning (FIG. 4), the driving motor 61 drives the rollers 62, 62', 62", 62''' and also drives the transmission caterpillar 63, thereby to draw the first scanning module 4 to horizontally moved from intersecting end of the first transparent case 2 and the second transparent case 3 to one end of the first transparent case 2. Then, the second scanning module 5 can be vertically moved upwardly from one end of the second transparent case 3 to the intersecting end of the first transparent case 2 and the second transparent case 3. In this way, the first scanning module 4 and the second scanning module 5 can return to their original positions thereby finishing the scanning operation.

Figure 5:
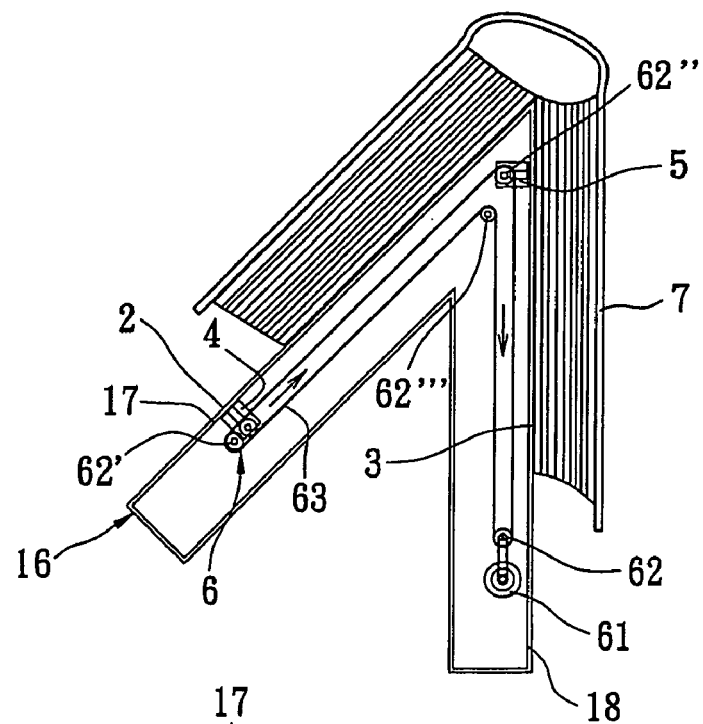
FIGS. 5 and 6 are schematic views showing different angles of the scanning table of the present invention.
Figure 6:
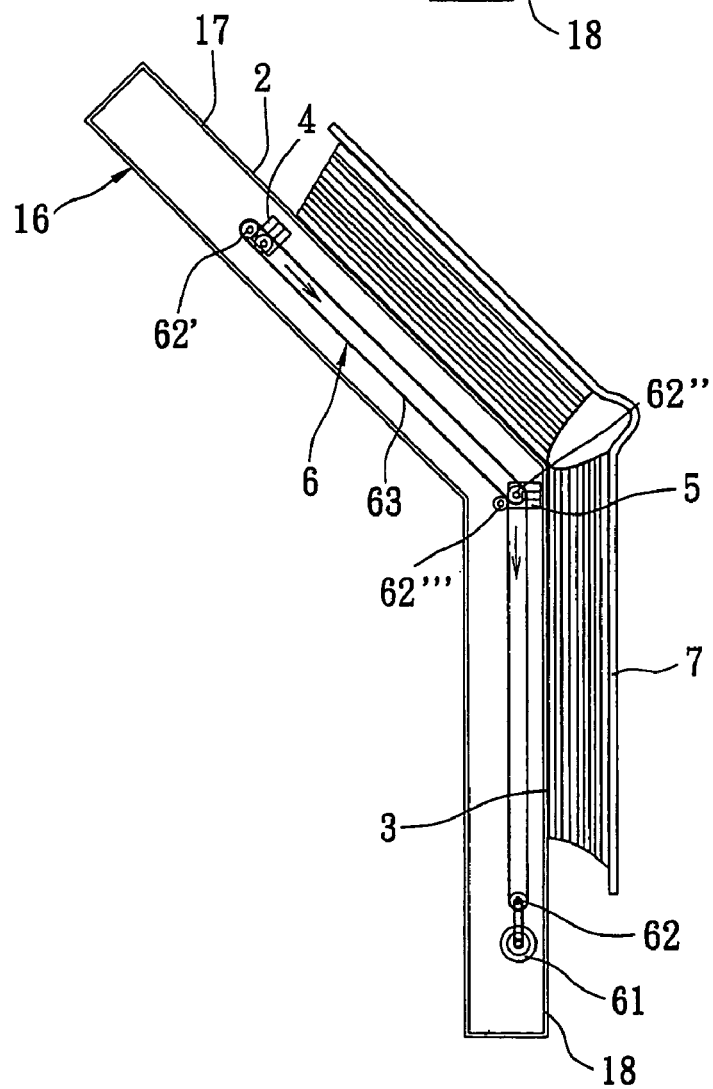

With reference to FIGS. 5 and 6, the two scanning modules 4, 5 for simultaneously scanning the first scanning region 2 and the second scanning region 3, respectively. With the 45~135 angles arrangement formed by first transparent case 2 and the second transparent case 3.

With the above arrangement, the present invention is to provide a scanning table for simultaneously scanning the left and right inner pages of a book by integrally combining a right-angle surface formed of two scanning regions with the table. Thus, the user can read on the table and easily scan the contents of the book via the scanning region without damaging the book. After finishing the scanning, he/she can take the digital information away via a built-in external port, thereby to save time.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A scanning table, comprising:
   a table body including a table surface, a first side and a second side, the first side and the second side being adjoined to the table surface; and
   a first scanning device provided in the table body, the first scanning device comprising:
   a first scanning region provided on the table surface;
   a second scanning region provided on the first side, the second scanning region being adjoined to the first scanning region;
   a first scanning module for scanning the first scanning region; and
   a second scanning module for scanning the second scanning region.

2. The scanning table according to claim 1, wherein the first scanning region is a first transparent case and the second scanning region is a second transparent case, each of said cases connected to each other in a right angle.

3. The scanning table according to claim 2, wherein the first scanning module and the second scanning module simultaneously scan the first scanning region and the second scanning region respectively.

4. The scanning table according to claim 3, wherein the first scanning module and the second scanning module move parallel to the direction of the first scanning region and the second scanning region respectively.

5. The scanning table according to claim 4, wherein the first scanning module moves horizontally from one end of the first transparent case to the intersecting end of the first transparent case and the second transparent case, and the second scanning module moves vertically and downwardly from the intersecting end of the first transparent case and the second transparent case to one end of the second transparent case.

6. The scanning table according to claim 4, wherein the first scanning module moves horizontally from the intersecting end of the first transparent case and the second transparent case to one end of the first transparent case, and the second scanning module moves vertically and upwardly from one end of the second transparent case to the intersecting end of the first transparent case and the second transparent case.

7. The scanning table according to claim 2, wherein the scanning device further comprises a transporting device for operatively connecting the first scanning module and the second scanning module and transporting the first scanning module and the second scanning module to scan the first scanning region and the second scanning region, respectively.

8. The scanning table according to claim 7, wherein the transporting device includes a driving motor, a plurality of rollers and a transmission caterpillar.

9. The scanning table according to claim 1, further comprising:
   a second scanning device provided in the table body, the second scanning device comprising:
   a third scanning region provided on the table surface;
   a fourth scanning region provided on the second side, the fourth scanning region being adjacent to the third scanning region;
   a third scanning module for scanning the third scanning region; and
   a fourth scanning module for scanning the fourth scanning region.

10. The scanning table according to claim 9, wherein the third scanning region is a third transparent case, the fourth scanning region is a fourth transparent case, and the third transparent case and the fourth transparent case are connected to each other in a right angle.

11. The scanning table according to claim 1, further comprising an operating panel and an external port electrically connected to the first scanning device.

12. The scanning table according to claim 11, wherein the external port includes sockets for connecting an external storage medium.

13. A scanning device for scanning a book, comprising:
a main body comprising a first plane and a second plane adjoined to the first plane, the second plane being not parallel to the first plane;
a first transparent case provided in the first plane;
a second transparent case provided in the second plane, the second transparent case being adjoined to the first transparent case;
a first scanning module provided inside the first transparent case;
a second scanning module provided inside the second transparent case; and a transporting device provided inside the main body for operatively connecting the first scanning module and the second scanning module, so as to transport the first scanning module and the second scanning module to scan the book on the first transparent case and the second transparent case.

14. The scanning device according to claim 13, wherein the first transparent case and the second transparent case are connected to each other in a right angle.

15. The scanning device according to claim 13, wherein the transporting device includes a driving motor, a plurality of rollers and a transmission caterpillar.

16. The scanning device according to claim 13, further comprising an operating panel and an external port electrically connected to the first scanning device.

17. The scanning device according to claim 16, wherein the external port includes sockets for connecting an external storage medium.

18. The scanning table according to claim 13, wherein the first scanning module and the second scanning module move parallel to the direction of the first scanning region and the second scanning region respectively for scanning the first scanning region and the second scanning region.

* * * * *